Figure 1:
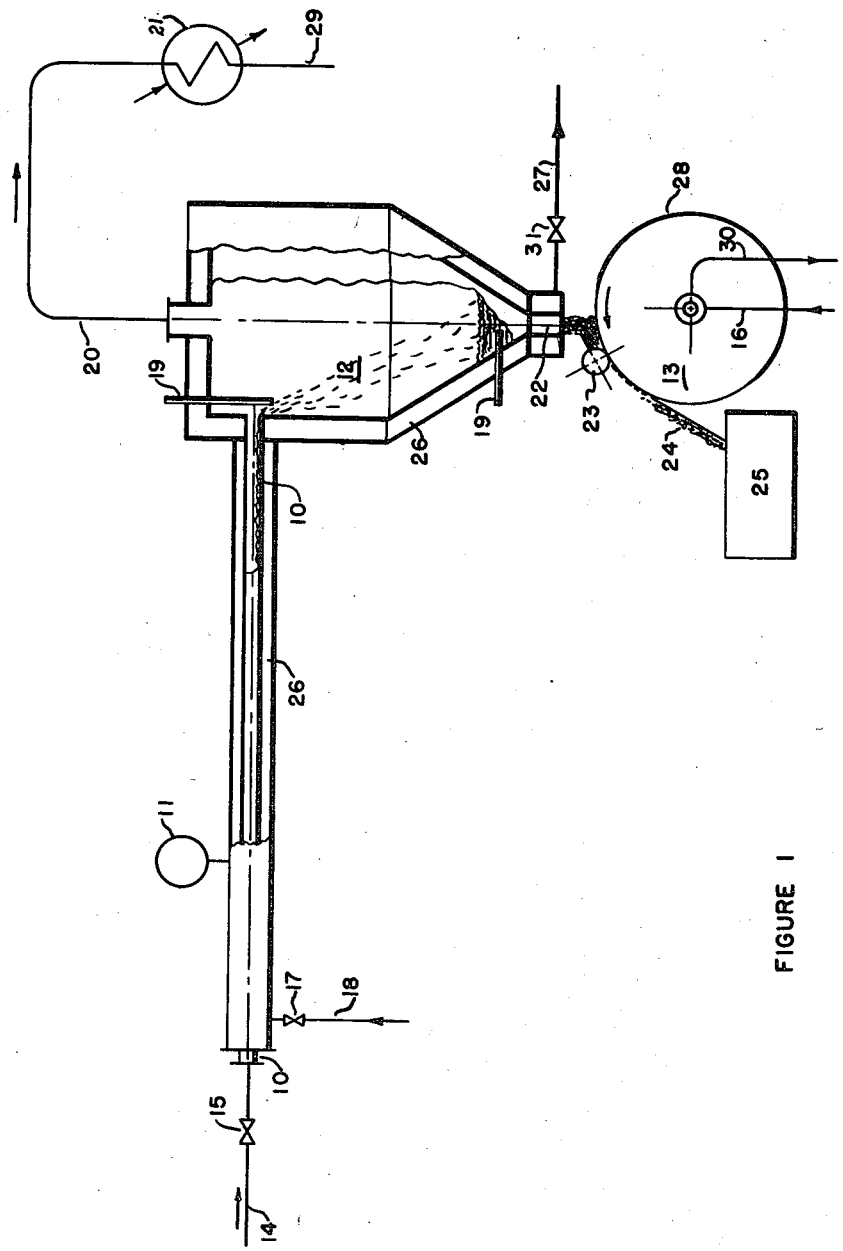

Aug. 14, 1951  C. M. NEHER ET AL  2,564,406
RECOVERY OF BENZENE HEXACHLORIDE
Filed May 10, 1949  2 Sheets-Sheet 1

FIGURE I

*INVENTOR.*
STEPHEN N. HALL
CLARENCE M. NEHER
BY Kenneth Swartwood
ATTORNEY

Aug. 14, 1951     C. M. NEHER ET AL     2,564,406
RECOVERY OF BENZENE HEXACHLORIDE
Filed May 10, 1949     2 Sheets-Sheet 2

INVENTOR.
STEPHEN N. HALL
CLARENCE M. NEHER
BY Kenneth Swartwood
ATTORNEY

Patented Aug. 14, 1951

2,564,406

UNITED STATES PATENT OFFICE 2,564,406

RECOVERY OF BENZENE HEXACHLORIDE

Clarence M. Neher and Stephen N. Hall, Baton Rouge, La., assignors to Ethyl Corporation, New York, N. Y., a corporation of Delaware Application May 10, 1949, Serial No. 92,267

3 Claims. (Cl. 159—47)

This invention relates to the manufacture of benzene hexachloride. More specifically, the invention is concerned with a new method and apparatus for the separation of high quality benzene hexachloride from reaction mixtures comprising benzene and benzene hexachloride.

Benzene hexachloride, also termed hexachlorocyclohexane or Gammexane, has in recent years become an important chemical. The compound exists in a number of isomers, the gamma isomer being a potent insecticide.

With the growing commercial importance of this material, attention has been directed to economical and efficient means of manufacture and recovery thereof. In general, benzene hexachloride is formed by the complete addition chlorination of benzene in the presence of actinic light. Usually, the chlorination has been carried out to an extent such that solid benzene hexachloride is formed in the reaction mixture. Various methods of recovery of this solid benzene hexachloride have been proposed. These recovery methods include crystallization, steam distillation, filtration and combinations of these steps.

While these recovery methods of the prior art are workable, they exhibit certain practical disadvantages which militate against their effectiveness. Thus, in steam distillation, the benzene hexachloride is recovered in mixture with water, and must be further dried. When crystallization separation is effected, the reaction mixture must be cooled to relatively low temperatures, and the benzene hexachloride crystals so formed are then filtered out. A further disadvantage of a crystallization separation operation is the non-uniform distribution of the several isomers of benzene hexachloride. This is caused by the difference in solubilities of the isomers, and results in the necessity of blending or mixing the solids to obtain a uniform composition. The general tendency of these prior recovery methods is to introduce collateral problems and disadvantages. Prior methods have not been fully successful with respect to producing an attractive high quality white product. A limitation of a crystallization and filtration recovery method is that the presence of solid benzene hexachloride is essential: such recovery methods are thus not applicable to the separation of benzene hexachloride dissolved in benzene.

An object of our invention is to provide a new and improved process for the recovery of high quality comminuted benzene hexachloride. A further object is to provide means for high percentage recovery from solutions of benzene hexachloride. Another object is to produce a benzene hexachloride product of uniform composition with respect to distribution of the isomers. An additional object is to eliminate the necessity of a steam distillation. A still further object is to avoid the necessity of moving equipment in the isolation of the benzene hexachloride from its solvent benzene. More specific objects will appear hereafter.

We accomplish these objects by contacting the mixture of benzene hexachloride and benzene with a heat transfer surface maintained at an elevated temperature. The benzene is flash vaporized, and simultaneously we fuse the benzene hexachloride content at an elevated temperature, preferably above 160° C. The molten benzene hexachloride is then immediately withdrawn from contact with the benzene vapor while maintaining its temperature at the same elevated level. The benzene hexachloride is then cooled, solidified and comminuted.

It has been found that at a temperature of 160° C., the properties of benzene hexachloride being recovered from a benzene solution go through a significant break point. Below this temperature the material is relatively stable or thermally resistant. At or above 160° C., benzene hexachloride is much less resistant to thermal decomposition. It would appear undesirable to heat the material to this elevated temperature range, especially in view of the relatively low boiling point, 80° C., of the benzene liquid present. However, we have discovered that the break point range in the thermal stability of benzene hexachloride is accompanied by an increase in fluidity of the molten material plus an improvement in the quality of the resultant product.

All the reasons for this peculiar phenomenon are not fully understood. However, we believe that, at about 160° C., a system containing minute quantities of benzene and the five isomers of benzene hexachloride undergoes a specific phase relationship change. For example, a solution of benzene in one of the fused isomers may be resolved into a benzene free isomer and a separate benzene phase. Regardless of the scientific explanation of the effect of temperature, the properties and appearance of benzene hexachloride recovered by our method are superior to that produced by other methods, particularly when the fused temperature is maintained above 160° C.

Benzene hexachloride, in the temperature range in which we operate, is prone to decompose and discolor or char. The adverse effects of this tendency are voided by exposing the benzene hexachloride to the elevated temperature for a brief period which is less than the decomposition time. We have found that the time resulting in decomposition is related to the temperature above 160° C. by a definite expression given below:

$$t = 13.00 - 0.0549\ T$$

where $t$ = time in minutes
and $T$ = temperature, ° C.

Our recovery method provides that the benzene hexachloride exposure at the elevated temperature is less than the time expressed above.

As already stated, we subject the benzene-benzene hexachloride mixture to heating so that the benzene hexachloride is brought to a temperature above 160° C. The temperature above this point is not highly critical, although the physical properties of the molten material continue to vary in degree. The preferred operating temperature range is 175° to 200° C., but higher temperatures can be employed if necessary. An operating temperature above 215° C. should be avoided. This temperature is not limiting because of thermal decomposition of the benzene hexachloride but does introduce a new factor. The temperature approaches the sublimation point of one of the isomers, and all the isomers have appreciable vapor pressures at this temperature. Operation above 215° C. will result in vaporization and the recycling of an unnecessarily large portion of the recoverable benzene hexachloride. This reduces the efficiency of the process by lowering the degree of recovery. In addition, because of the different vapor pressures of the isomeric forms the product composition does not correspond to the composition of the benzene hexachloride produced by the reaction.

The time-temperature relationship heretobefore stated relates to the effect of temperature alone as effecting the allowable exposure time. In order to take full advantage of the allowable exposure time, it has been found very desirable to utilize non-catalytic materials for the heat transfer element. Nickel, glass or ceramic materials are the preferred materials of construction for this purpose.

The process of our invention can be carried out in several ways. For example, the vaporization-fusion heat transfer surface can be either the inside or outside of a tubular unit. Plane surfaces can, of course, be employed, although they do not permit as efficient design as heat exchange units of circular cross section. With respect to the cooling-solidifying-comminuting operation, different types of equipment can be employed for this operation.

Figure 2:
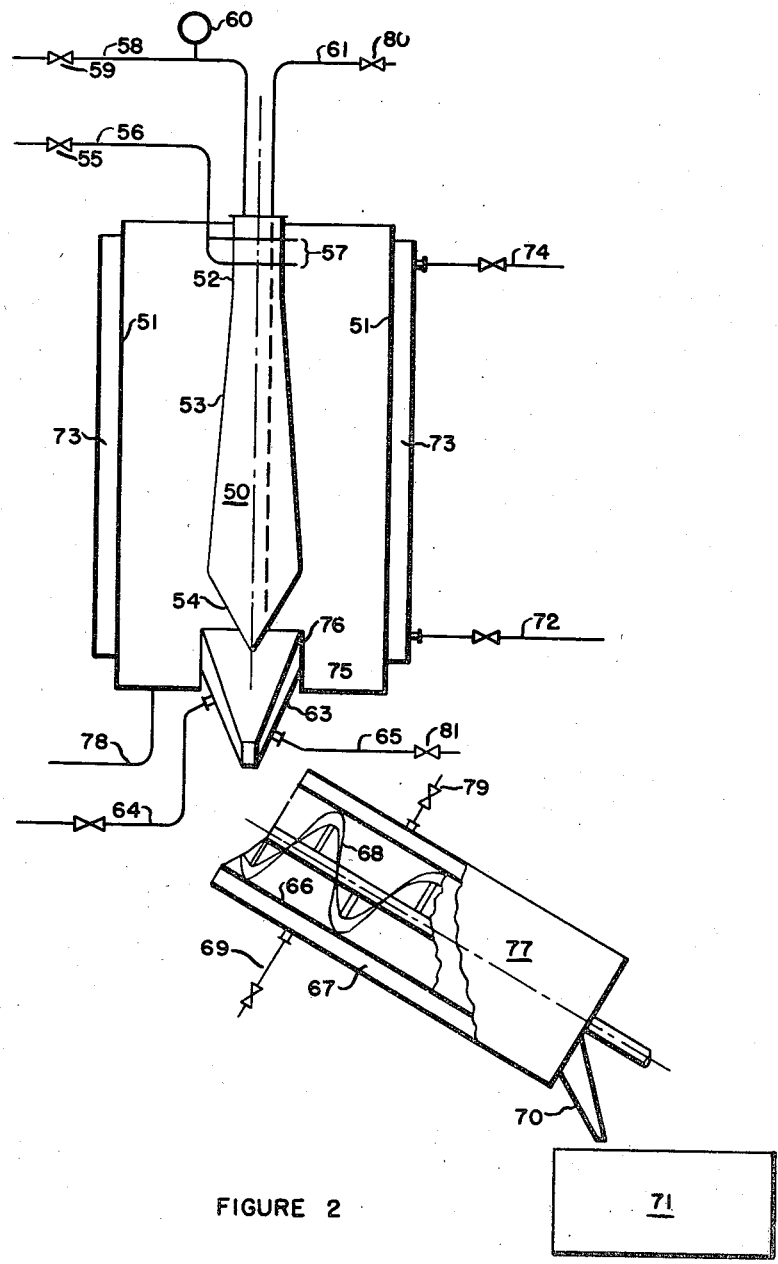

For a better understanding of the operation of the invention several embodiments are illustrated by the accompanying figures and are described herein. Figure 1 shows an embodiment employing an externally heated tubular heat transfer element to carry out the vaporization-fusion steps. Figure 2 illustrates the operation of the process with an internally heated unit for the same purpose. Each of these embodiments possesses specific advantages so the suitability for specific installations will depend on the requirements.

Referring to Figure 1, the main units of equipment for this embodiment are the vaporizing-fusing element 10, a separating chamber 12, and a cooler-solidifier-comminutor 13. A solution of benzene hexachloride in benzene is fed to the unit through a feed line 14. The feed rate is controlled by valve 15.

Heat is supplied to tube 10 at a rate and temperature adequate to vaporize substantially all the benzene content of the feed stream and to fuse the benzene hexachloride content. As stated above, the temperature of the heat transfer surface is preferably sufficient to heat the benzene hexachloride released by the benzene vaporization, to at least 160° C. A heat transfer surface maintained at 165 to 170° C. is usually fully adequate when this minimum temperature is used.

The vaporized benzene and fused benzene hexachloride are discharged from heating element 10 to disengaging space 12. The benzene vapors are separately withdrawn through line 20 and passed to condenser 21. Benzene liquefied therein is discharged through line 29 and recycled to the chlorination reactor or stored for subsequent chlorination.

Molten benzene hexachloride is released from the disengaging space through line 22 to a cooler-solidifier-comminutor 13. This apparatus comprises essentially an internally cooled rotating drum or cylinder 28. Cooling water is circulated by lines 16 and 30. Molten benzene hexachloride accumulates on the top of this drum and is distributed as a relatively thin layer on the drum surface by a heated, tubular distributor bar 23. The distributor bar is heated by steam or other means and is adjustable to allow variation in the thickness of the benzene hexachloride layer.

The thin layer of solidified benzene hexachloride is removed from the drum surface as discrete flakes by the action of the scraper blade 24. The flakes or comminuted particles formed are discharged to container 25.

An essential provision of the apparatus for the present embodiment as well as other embodiments of the invention are means for maintaining the benzene hexachloride at a uniformly elevated temperature until the benzene hexachloride and benzene are separately withdrawn. In the embodiment of Figure 1, this is assured by the extension of the steam jacket 26 around the separatory apparatus 12. Therefore, the molten benzene hexachloride discharged to drum 28 is substantially at the same temperature as the material leaving the vaporizing-fusing tube 10. Condensate is removed from this jacket by line 27.

Operation of the unit is observed by following principally the temperature conditions therein. Wells for thermometers or thermocouples 19 are located at significant points in the apparatus. Dial gauge 11 provides ready measurement of steam pressure in the heating jacket.

Numerous variations in the particular dimensions of the apparatus of Figure 1 are of course possible, subject to maintaining the process requirements heretofore stated. In one specific apparatus, the vaporizing-fusing tube is a one-inch tube 20 feet long. In a typical operation, a solution of 25 weight percent benzene hexachloride solution is fed to the vaporizing-fusing tube at a rate of 600 pounds per hour. Saturated steam at 200 pounds per square inch gauge is used to supply heat. The benzene solvent is vaporized and the fused benzene hexachloride is delivered to the separator at a temperature of about 170 to 180° C. Well over 90 percent of the benzene hexachloride solution is recovered as a high quality, attractive white flaked material by this single pass operation.

The embodiment of Figure 1 exhibits several specific advantages. These include forced flow of the feed solution and some superheating of the benzene vapor formed. With respect to force feeding, this is of course possible because of the vaporizing element 10 being a tubular unit. The practical significance of this is that the length of the heat transfer element is not limited to the flow induced by gravity as might be the case in other embodiments.

The possibility of superheating benzene vapor is occasionally of benefit in operation. Being in confined relationship to the fusing-vaporizing heat transfer element 10, the benzene vapor can be heated above its boiling point or the temperature of vaporization from the solution. This superheat tends to insure that the benzene hexachloride product will be an attractive white flaked material relatively free of benzene.

A second embodiment of our invention is carried out in the apparatus of Figure 2. The important units of this apparatus are the vaporizing-fusing unit 50, a shell 51 serving as the benzene condensing surface and a solidifier-comminutor 77. The vaporizing-fusing unit 50 is an internally heated apparatus of circular cross section. This unit could be of tubular shape but the design illustrated has been found to be particularly efficient. From the top down, the vaporizer-fuser consists of a short cylindrical section 52, a section 53, diverging at about 7° and a final conical section 54. This unit is mounted concentrically in the cylindrical shell 51.

In operation, a stream of a benzene solution of benzene hexachloride is fed through valve 55 and line 56. This stream is sprayed on the surface of vaporizer-fuser 50, by one or more distributing rings 57. The unit is heated by steam supplied through line 58, and controlled by valve 59, the pressure being shown by gauge 60. Condensate is discharged through line 61. In flowing down the outside of the vaporizer-fuser 50, the benzene of the solution is vaporized, and the benzene hexachloride is fused. The fused material drips from the end of the unit and is discharged through a steam heated funnel 63. Steam is supplied to the jacket of funnel 63 by line 64. Condensate is removed through line 65.

Fused benzene hexachloride discharged from the vaporizer-fuser by funnel 63 is gravity fed to cooler-comminutor 77. The cooler-comminutor comprises an internal cylindrical shell 66, a jacket shell 67 for circulating cooling medium and a spiral ribbon-type conveyor 68. Cooling medium is introduced to jacket 67 by lines 69 and 79. In passing through this device, the molten benzene hexachloride is solidified, scraped from the shell walls 66 by the rotating spiral conveyor 68 and discharged through a spout 70 to container 71.

The benzene vapor, formed by the heat supplied by heating unit 50, is condensed on the walls of shell 51. Heat is removed at this point by cooling medium supplied by line 72 to jacket 73 and discharged by line 74. The liquid, predominantly benzene, condensed on wall 51 collects in the annular trough 75 formed by walls 51 and 76 and bottom plate 77. This liquid is discharged by line 78 to subsequent operations or recycled to the chlorination step.

The following describes the application of the embodiment of Figure 2 on a commercial scale recovery operation. A benzene solution of 24 percent benzene hexachloride is fed to the apparatus through line 56, at the rate of 2470 pounds per hour. The solution is uniformly distributed on the vaporizer-fusing element 50 through the double distributors 57. The vaporizing-fusing element 50 is heated by steam, at a pressure of 180 pounds per square inch, to a temperature of approximately 190° C. Benzene is rapidly "flashed" or vaporized off and the benzene hexachloride fused on the surface, running down and dripping into funnel 63. The fused benzene hexachloride is delivered from the funnel 63 to the internal surface 66 of the solidifier-comminutor at a temperature of 185 to 190° C., and is rapidly chilled and solidified therein.

The solidifier-comminutor 77 discharges 300 pounds of benzene hexachloride, of 99 percent purity, to container 71. This corresponds to a yield or recovery of 50 percent of the benzene hexachloride fed in the desired solid, flaked form. The rest of the benzene hexachloride, except for minor losses, is discharged in recoverable form, as stated hereafter.

The benzene flashed from the vaporizing-fusing element 50 is condensed on shell 51, maintained at a temperature of about 30° C. by cooling water circulated through lines 72 and 74. At a high rate of production, as in this example, the benzene evidently entrains an appreciable quantity of the feed solution before vaporization occurs. The benzene condensed on shell 51 thus contains appreciable quantities of benzene hexachloride but at a much lower concentration. The benzene solution collected in trough 75 and discharged through line 78 amounts to 2125 pounds benzene in the feed solution. This recovered benzene contains 285 pounds of benzene hexachloride, giving a solution of about 13.4 percent benzene hexachloride. The total recovery of benzene hexachloride is thus approximately 98 percent of the benzene hexachloride in the feed stream.

At the maximum benzene hexachloride temperature of 190° C. in this example, the allowable residence time, as determined from the relationship heretofore given, is approximately 160 seconds. The actual residence time in the present example is of the order of ten seconds or less so there is an ample margin of safety to assure a high quanity white product with no discoloration caused by decomposition.

The embodiment of Figure 2 is advantageous in omitting the need for a separate condenser for liquefying the benzene vapor formed by the vaporizing-fusing unit 50. The condensation of the vapor on the cooled shell wall 51 provides a very compact operation. The dimensions of the apparatus of Figure 2 are not critical. However, our preferred design provides that the vaporizing-fusing element 50 should not be closer to the cooled shell walls than about one foot. At high production rates, this distance between the heated and cooled surfaces is believed to contribute to a good separation of the fused benzene hexachloride and the vaporized benzene.

It is not essential that the vaporizing-fusing heat transfer unit 50 be tapered. However, the slight taper has been found beneficial in improving the efficiency of benzene hexachloride recovery. The taper is believed to minimize the spraying of unvaporized solution from the heat transfer surface at high production rates.

The two embodiments described above show how our invention attains the objects desired. A high percentage recovery of benzene hexachloride is attained, not being limited to solid crystals formed by exceeding saturation limits during chlorination; or by cooling a solution to crystallize part of the benzene hexachloride. The use of a steam distillation, one of the prior methods, is wholly eliminated. No moving equipment is required in the separation of the benzene hexachloride. The benzene hexachloride recovered by our method is of uniform composition with respect to distribution of the isomeric forms, as all the benzene hexachloride recovered is separated simultaneously.

It will be apparent to those skilled in the art that numerous embodiments of the method and apparatus are possible within the scope of the following claims.

We claim:

1. In the recovery of solid dry benzene hexachloride from a solution thereof in benzene, the steps of heating the solution, vaporizing the benzene and simultaneously fusing the benzene hexachloride at a temperature of 160 to 215° C., withdrawing the fused benzene hexachloride from contact with the benzene vapor while maintaining at a temperature within the aforesaid range, the total time of the benzene hexachloride at said temperature being less than that given by the expression $$t = 13.00 - 0.0549\ T$$

where $t$ = time in minutes
and T = temperature, °C.

2. In the recovery of solid, dry, benzene free benzene hexachloride from benzene solution, the method comprising feeding the solution to the periphery of an internally heated vertical heat transfer conduit, vaporizing the benzene and simultaneously fusing the benzene hexachloride at a temperature of 160 to 215° C., condensing the benzene on a cooled surface surrounding the heat transfer conduit, disengaging the fused benzene hexachloride from contact with the benzene vapor by gravity flow but maintaining the fused benzene hexachloride at a temperature within the aforementioned range during the contact with the benzene vapor, the total time at the fused temperature being less than that given by the expression $$t = 13.00 - 0.0549\ T$$

where $t$ = time in minutes
and T = temperature, °C.

3. In the recovery of solid dry benzene hexachloride from a solution thereof in benzene the steps of heating the solution, vaporizing the benzene and simultaneously fusing the benzene hexachloride at a temperature of 175 to 200° C., withdrawing the fused benzene hexachloride from contact with the benzene vapor while maintaining at a temperature within the aforesaid range, the total time of the benzene hexachloride at said temperature being less than that given by the expression:

$$t = 13.00 - 0.0549\ T$$

where $t$ = time in minutes
and T = temperature, °C.

CLARENCE M. NEHER.
STEPHEN N. HALL.

REFERENCES CITED

The following references are of record in the file of this patent:

UNITED STATES PATENTS

| Number | Name | Date |
|---|---|---|
| 575,854 | Scott et al. | Jan. 26, 1897 |
| 1,431,676 | Miller | Oct. 10, 1922 |
| 2,445,526 | Heitz et al. | July 20, 1948 |

OTHER REFERENCES

Chem. Abstracts, vol. 41, Col. 4111 of 1947.
Chemistry and Industry—Article by Slade—October 13, 1945 (pgs. 314–19).